United States Patent [19]

Smed

[11] Patent Number: 5,636,659
[45] Date of Patent: Jun. 10, 1997

[54] VARIABLE AREA COMPENSATION VALVE

[75] Inventor: Jan P. Smed, Winter Springs, Fla.

[73] Assignee: Westinghouse Electric Corporation, Pittsburgh, Pa.

[21] Appl. No.: 544,348

[22] Filed: Oct. 17, 1995

[51] Int. Cl.$^6$ .................................................. F16K 15/00
[52] U.S. Cl. ........................... 137/543.13; 137/543.15
[58] Field of Search ........................ 137/543.13, 543.15

[56] References Cited

U.S. PATENT DOCUMENTS

| | | | |
|---|---|---|---|
| 2,725,076 | 11/1955 | Hansen | 137/543.15 |
| 3,849,023 | 11/1974 | Klompas | 415/170 |
| 4,245,954 | 1/1981 | Glenn | 415/200 |
| 4,576,548 | 3/1986 | Smed et al. | 415/137 |
| 4,622,994 | 11/1986 | Rosaen | 137/543.13 |
| 4,657,479 | 4/1987 | Brown et al. | 415/138 |
| 4,792,277 | 12/1988 | Dittberner, Jr. et al. | 415/160 |
| 4,860,995 | 8/1989 | Rogers | 137/543.13 |
| 4,863,343 | 9/1989 | Smed | 415/138 |
| 4,887,432 | 12/1989 | Mumford et al. | 60/759 |
| 5,062,452 | 11/1991 | Johnson | 137/543.13 |
| 5,118,120 | 6/1992 | Drerup et al. | 277/176 |
| 5,149,250 | 9/1992 | Plemmons et al. | 415/209.3 |
| 5,269,651 | 12/1993 | Ostermeir et al. | 415/209.1 |
| 5,288,020 | 2/1994 | Pirker | 239/127.3 |
| 5,425,397 | 6/1995 | Mackal | 137/543.13 |

*Primary Examiner*—John T. Kwon

[57] ABSTRACT

A variable area restrictor is disclosed that is preferably used in a turbine engine to provide improved matching between the pressure required for aerofoil cooling and the somewhat lower pressure requirement for supplying air to the interstage seals and disc cavities. In a preferred embodiment, the valve of the present invention comprises a spring loaded valve assembly with a fixed minimum flow area controlled by pre-setting a minimum dimension for the opening between an inlet and the housing or body of the valve. A pre-loaded spring maintains the lift at this minimum dimension until the pressure drop across the flow area exceeds a certain value. Above this critical pressure drop, the valve lifts, causing the flow area to increase, and thereby reducing the supply pressure that would be otherwise necessary to achieve a disc cavity flow adequate to maintain the temperatures within specifications.

4 Claims, 2 Drawing Sheets

5,636,659

VARIABLE AREA COMPENSATION VALVE

The present invention relates to turbomachinery and in particular to turbine engines. More particularly, the present invention relates to methods and apparatus of regulating the flow of gases through the turbine blades themselves, after combustion.

BACKGROUND OF THE INVENTION

The background of turbomachinery is well known in the art and familiarity with such art is presumed. The details of a typical prior art turbine are disclosed in U.S. Pat. No. 4,863,343, which is issued to the inventor of the present invention and assigned to the assignee of the present invention. The disclosure of this patent is incorporated herein by reference as if fully set forth.

Typical prior art turbines use a fixed, low restriction flow area at the inner shroud to supply air to the seals and disc cavities. In some designs, however, the pressure required for stator vane cooling is considerably higher than that required for the seals and disc cavities. When this situation occurs the pressure must be raised above the vane and is therefore higher than required for disc cavity flows thereby resulting in excessive leakage. This change is accompanied by reduced engine performance which must be accepted or an additional compensating pressure drop must be built into the system at the inner shroud by decreasing the otherwise relatively large inner shroud flow area. However, the added restriction at the inner shroud should be acceptable for nominal design point operation. A problem arises if the disc cavity flow required to maintain acceptably low disc cavity temperatures is higher than expected. Should this situation arise in an assembled, ready to run engine, the only choice is to increase the pressure at the outer vane shroud until sufficient inner shroud flow and acceptably low disc cavity temperatures are obtained. As a result, the outer shroud pressure is now higher than required for vane cooling and preventing contamination, and hence a potentially large additional performance-penalizing flow will be automatically supplied from the compressor bleed system, in addition to what is actually required for the disc cavities.

Therefore, it would be desirable to provide an apparatus and methods by which the pressure required for airfoil cooling in a turbine can be achieved without jeopardizing the lower pressure requirement for supplying air to the interstage seals and disc cavities. Accordingly, it is an object of the present invention to permit the compensation of the pressure within various sections of a turbine engine. It is a further object of the present invention to optimize the pressure distribution within a turbine so as to achieve maximum efficiency and maximize power.

SUMMARY OF THE INVENTION

It has now been found that the above-described problem can be minimized and the above-state objectives achieved by inserting a variable area restrictor at the inner shroud in place of the otherwise fixed geometry flow area. The present invention provides a variable area matching valve designed to provide for improved matching between the pressure required for aerofoil cooling and the lower pressure requirement for supplying air to the interstage seals and disc cavities. In a preferred embodiment, the variable area valve of the present invention comprises a spring-loaded valve assembly with a fixed minimum flow area controlled by pre-setting a minimum dimension for the opening between an inlet and the housing or body of the valve. A pre-loaded spring maintains the lift at this minimum dimension until the pressure drop across the flow area exceeds a certain value. Above this critical pressure drop, the valve lifts, causing the flow area to increase, and thereby reduce the supply pressure that would be otherwise necessary to achieve a disc cavity flow adequate to maintain the operating temperatures within specification.

DETAILED DESCRIPTION OF THE INVENTION

The present invention is designed to provide improved matching between the pressure required for air flow cooling and the lower pressure required for supplying air to the interstage seals and disc cavities. As mentioned above, a fixed, low restriction flow area at the inner shroud is typically used to supply air to the seals and disc cavities. A preferred embodiment of a variable area compensation valve which minimizes the above-described problems by inserting a variable area restrictor at the inner shroud in place of the otherwise fixed geometry flow area is illustrated in FIG. 1.

Figure 1:
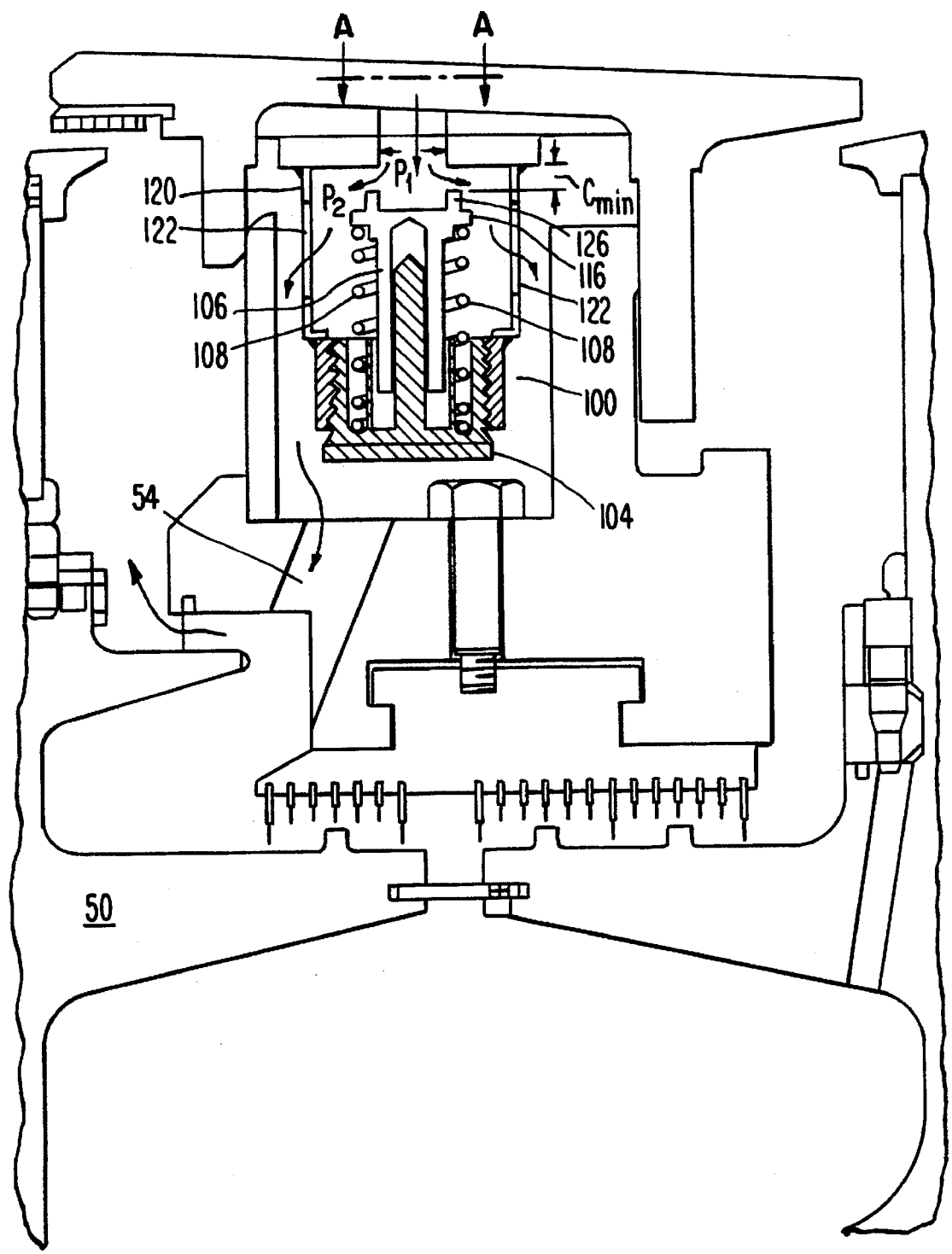
FIG. 1 is cross-sectional view of the variable area compensation valve of the present invention and the surrounding components of a typical turbine engine.

Referring now to FIG. 1, a preferred embodiment of a variable area restrictor 100 is shown positioned between an inlet 52 and an outlet 54 in a gas flow system such as that found within a turbine engine 50. The variable area restrictor 100 preferably comprises a housing 120 connected to the inlet 52. The housing 120 preferably has a housing port or ports 122 in communication with the outlet 54. The variable area restrictor 100 also has an adjustable inner section 104 connected to the housing 120, and a piston 106 disposed around the inner section 104 and in sliding engagement therewith. The piston 106 has a distal end 116 disposed a variable distance ($C_{min}$) between the inlet 52 and the housing 120. In preferred embodiments, the inner section 104 is threaded and cooperates with threads on the housing 120. By rotating the inner section 104, the distance the piston 106 can travel is adjusted, and the variable distance, $C_{min}$, can be altered. A spring 108 is preferably disposed between the piston 106 and the inner section 104 such that the distal end of the piston 116 is urged toward a position that would close off the inlet 52.

Figure 2:
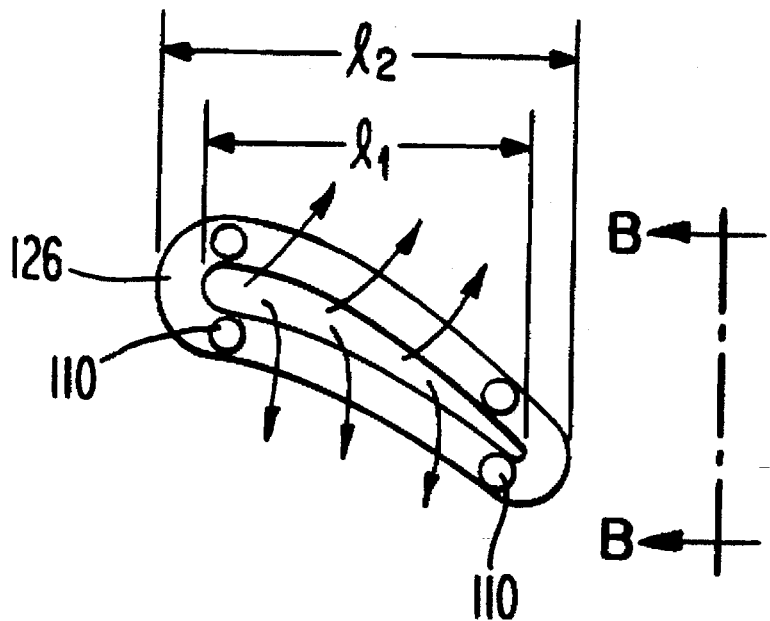
FIG. 2 is a cross-sectional taken along section line A—A in FIG. 1 to illustrate the typical shape of the inlet and the distal end of the variable area compensation valve of the present invention.
Figure 3:
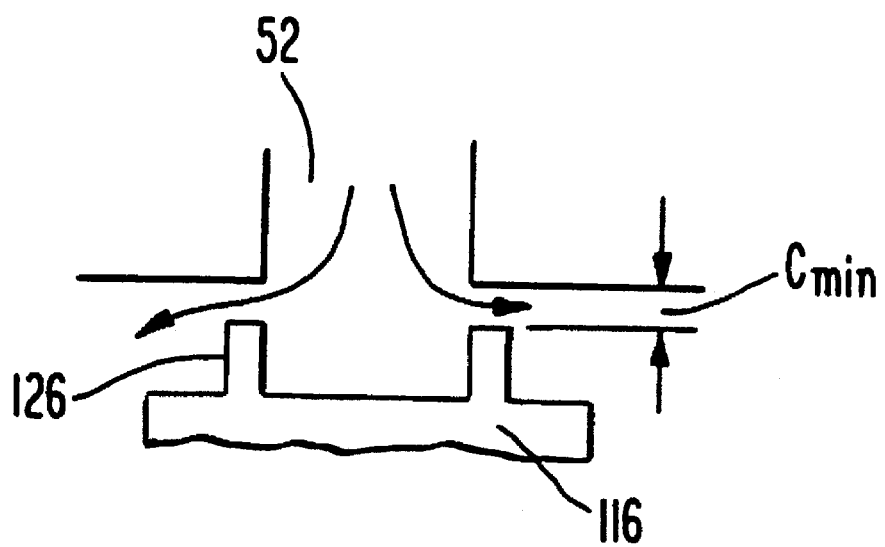
FIG. 3 is a cross-sectional view of FIG. 2 taken along line B—B to illustrate the structure of a preferred embodiment of the restriction section of the variable area compensation valve of the present invention.

As seen in FIG. 2, the housing 120 is connected to the turbine 50 by one or more standoffs 110. Also visible in FIG. 2 is a preferred shape of the opening that communicates with the inlet 52. In a preferred embodiment, the distal end of the piston 106 comprises a raised, non-circular ridge 126 for defining a passage between the inlet 52 and the housing 120. As illustrated, distances $1_1$ and $1_2$ define the relationship between these areas. Further details of these aspects of the invention are illustrated in FIG. 3, which shows an enlarged and broken away view of the non-circular ridge 126 and its relationship to the distance $C_{min}$ described above.

Thus, when the disclosed valve structure 100 is in operation and the pressure drop at the inlet 52 reaches a pre-determined level, the piston 116 moves against the biasing force of the spring 108 and creates a greater area, i.e., the distance $C_{min}$ increases, thereby reducing the pressure and increasing the flow. The spring-loaded valve assembly 100 with a fixed minimum flow area is controlled by pre-setting a minimum clearance distance ($C_{min}$) via the local standoffs 110 seen in FIG. 2. The pre-loaded spring 108 maintains a lift at $C_{min}$ until the pressure drop (P1-P2) across the flow area is established by the $C_{min}$ exceeds a certain, pre-determined critical pressure drop value. Above this critical pressure drop, the piston 106 of the valve 100 lifts, causing the flow area to increase, thereby reducing the supply pressure that would otherwise be necessary to achieve a disc cavity flow adequate to maintain the disc cavity temperature within specifications.

The present invention thus provides a variable area orifice for a combustion turbine at the stator vane in a shroud which provides additional cooling flow without a commensurate increase in supply pressure. More generally, a variable area restrictor positioned between an inlet and an outlet in a gas flow system is disclosed which includes a housing connected to the inlet that has a port in communication with the outlet. A piston disposed between the inlet and the housing port permits the area between the inlet and the outlet, i.e., a restriction, to vary so that when the pressure at the inlet reaches a pre-determined level, the piston moves and creates a greater area, thereby reducing the pressure and increasing the flow.

Although certain embodiments of the present invention have been set forth above and described in detail, these embodiments are meant to be descriptive and the present invention is not to be limited by this disclosure. Upon reviewing the foregoing description, those of skill in the art will immediately realize various improvements, modifications and adaptation of the concepts disclosed herein without departing from the spirit of the present invention. For example, there are numerous types of variable restrictors that are generally known that can be adapted for use with the concepts disclosed herein. Alternatively, the variable restriction valve structure disclosed herein can be readily incorporated into other flow systems in addition to the specific example of a turbine that is provided above. Therefore, reference should be made to the appended claims in order to determine the full scope of the present invention.

I claim:

1. A variable area restrictor positioned between an inlet and an outlet in a gas flow system comprising:

a housing connected to the inlet, the housing having a housing port in communication with the outlet;

an adjustable inner section connected to the housing;

a piston disposed around the inner section and having a distal end disposed a variable distance between the inlet and the housing; and a spring disposed between the piston and the inner section, whereby, when the pressure at the inlet reaches a pre-determined level, the piston moves and creates a greater area, thereby reducing the pressure and increasing the flow.

2. The variable area restrictor of claim 1, wherein the inner section is threaded and cooperates with threads on the housing.

3. The variable area restrictor of claim 1, wherein the housing is connected to the inlet by one or more standoffs.

4. The variable area restrictor of claim 1, wherein the distal end of the piston comprises a raised, non-circular ridge for defining a passage between the inlet and the housing.

* * * * *